(12) United States Patent
Naik et al.

(10) Patent No.: US 7,930,202 B2
(45) Date of Patent: Apr. 19, 2011

(54) DETERMINING A CHANGE SCHEDULE

(75) Inventors: Vijay Krishnarao Naik, Pleasantville, NY (US); Biplav Srivastava, Ultar Pradesh (IN)

(73) Assignee: International Business Machines Corporation, Armonk, NY (US)

(*) Notice: Subject to any disclaimer, the term of this patent is extended or adjusted under 35 U.S.C. 154(b) by 1356 days.

(21) Appl. No.: 11/421,877

(22) Filed: Jun. 2, 2006

(65) Prior Publication Data

US 2007/0282651 A1    Dec. 6, 2007

(51) Int. Cl.
*G06F 9/46*      (2006.01)
*G06F 11/34*    (2006.01)

(52) U.S. Cl. ............................................. 705/8; 705/12
(58) Field of Classification Search .................. 705/8, 12
See application file for complete search history.

(56) References Cited

U.S. PATENT DOCUMENTS

| | | | |
|---|---|---|---|
| 6,611,275 B1 | 8/2003 | Zey et al. | |
| 6,647,448 B1 | 11/2003 | Brelin | |
| 6,988,128 B1 | 1/2006 | Alexander et al. | |
| 2003/0233274 A1* | 12/2003 | Urken et al. | 705/12 |
| 2006/0161879 A1* | 7/2006 | Lubrecht et al. | 717/101 |

FOREIGN PATENT DOCUMENTS

WO      WO02029647 A1    11/2002

OTHER PUBLICATIONS

Ng, J.M.; Chan, E.; Lam, L.E.; "Design and implementation of conference scheduling and voting facilities for a multi-media conferencing system"; Proceedings. Eighteenth Annual International Computer Software and Applications Conference (COMPSAC 94); Cat. No. 94CH35721; 1994; p. 221; IEEE Comput. Soc. Press.

Sen, S.; Haynes, T.; Arora, N.; "Satisfying user preferences while negotiating meetings"; International Journal of Human-Computer Studies; v 47; n 3; Sep. 1997; p. 407-27; Academic Press.

Oh, J.; Smith, S.F.; "Learning User Preferences in Distributed Calendar Scheduling"; PATAT 2004. Proceedings of the 5th International Conference on the Practice and Theory of Automated Timetabling, 2004; p. 35-50.

* cited by examiner

*Primary Examiner* — Susanna M Diaz
(74) *Attorney, Agent, or Firm* — Gibb I.P. Law Firm, LLC; Derek S. Jennings

(57) ABSTRACT

A method, system, and computer readable storage medium for determining a change schedule having multiple approvers with scheduling constraints. The constraints associated with each approver are analyzed to identify a set of candidate change schedules for each time period of a number of time periods. Weights for each approver over each of the time periods are assigned to each possible change schedule. Each approver is then asked to input preferences for each of the candidate change schedules. These preferences are then weighted for each candidate change schedule. A best change schedule is selected based on the weighted preferences of each approver for each of time periods.

6 Claims, 8 Drawing Sheets

DETERMINING A CHANGE SCHEDULE

FIELD OF THE INVENTION

The present invention relates to change management processes for Information Technology (IT) systems, and particularly to determining a change schedule.

BACKGROUND OF THE INVENTION

IT systems are a complex interplay of a multiple service components, resources, users of IT services, and service and site specific policies. An IT service component may depend on one or more other service components and resources, and it may provide support to one or more other service components. The component also may directly support user requests and demands. Because these are dynamic systems, changes need to be made from time to time; e.g., upgrades, fixes, and so on. Making a change affects the availability of the IT service component being changed, and affects the availability of other IT service components that depend on the component being changed.

The time interval when the change is being applied is of interest to the direct users of a component as well as to the users of components that depend on the component being changed. In addition, such change also brings uncertainty about the availability or reliability of a service after the change is applied. For these reasons, the making of a change to any IT component requires consent from the users of that component as well as from the users of the components that depend on the component being changed. In addition, policies are put in place for streamlining such changes.

In an IT ecosystem, approvers are designated to represent the interests of various user groups and IT service components that form the fabric of an IT system. An approver is responsible for approving two aspects of a change request:
  (i) the actual change to be implemented, and
  (ii) the time when the change is to be applied.

An approver is required to take into account the interests of the users or of the service component the approver represents. An approver also may be responsible for policy enforcement in applying a change.

Throughout this specification, the time window when a change is to be applied will be referred to as the change schedule.

As mentioned earlier, a change affects the availability of the component being changed as well as the components that are dependent on the component being changed. Thus, in determining a change schedule, there is a tension between the availability demands on a component and the importance or the urgency of the change being applied. The larger the number of components affected by a change, higher is the number of constraints to the problem of determining an all-agreeable change schedule. In many cases, a change to a lower level IT service component such as OS platform, can affect ten or more other IT service components and user groups. Finding a common change schedule agreeable to all involved parties is a challenging problem.

Today this problem typically is handled manually by proposing a change schedule and asking the approvers to approve or disapprove the change schedule. Even if the schedule is unacceptable to one of the approvers, the process is repeated with another change schedule. Thus, scheduling a required change itself can take an indeterminate amount of time and may waste valuable time before an urgent change to the system can be made. Underneath this inefficiency there are two fundamental problems:

(i) the proposed change schedules are determined by guesswork rather than by taking into account the available information on the constraints and priorities of the individual approvers and by deducing an acceptable change schedule intelligently based on the available information
  (ii) relative impact of the change on the individual approver's domain is not considered and thus, priorities of all approvers are considered equal. This can result in unnecessary delays and deadlocks in scheduling.

SUMMARY OF THE INVENTION

This invention broadly discloses a method and system for intelligently determining a change schedule when multiple approvers with possibly conflicting objectives and goals are involved. The scheduling first identifies the scheduling constraints associated with each approver by analyzing the current priorities of the services managed by the approver, taking into account the other services dependent on these services as well as any policies governing the priorities and change schedules for that service. Following this, the constraints associated with each approver are analyzed to identify a set of possible change schedules. For each possible change schedule, the approvers themselves are prioritized based on the relative importance, during the change period, of the service they manage. From these priorities, normalized weights for each approver and for each possible change schedule are calculated. Following this, each approver is asked to rank and assign numerical preferences to each of the possible change schedules determined earlier. These numerical preferences are then weighted by the normalized approver weights for that change schedule. For each possible change schedule, the weighted numerical preferences—one for each approver—are added to calculate the total number of weighted votes received for that change schedule. The change schedule with the highest tally is selected as the approved change schedule.

A computer program product also is disclosed.

In the figures, the direction of the arrows indicates the direction of information flow.

DETAILED DESCRIPTION

Figure 1:
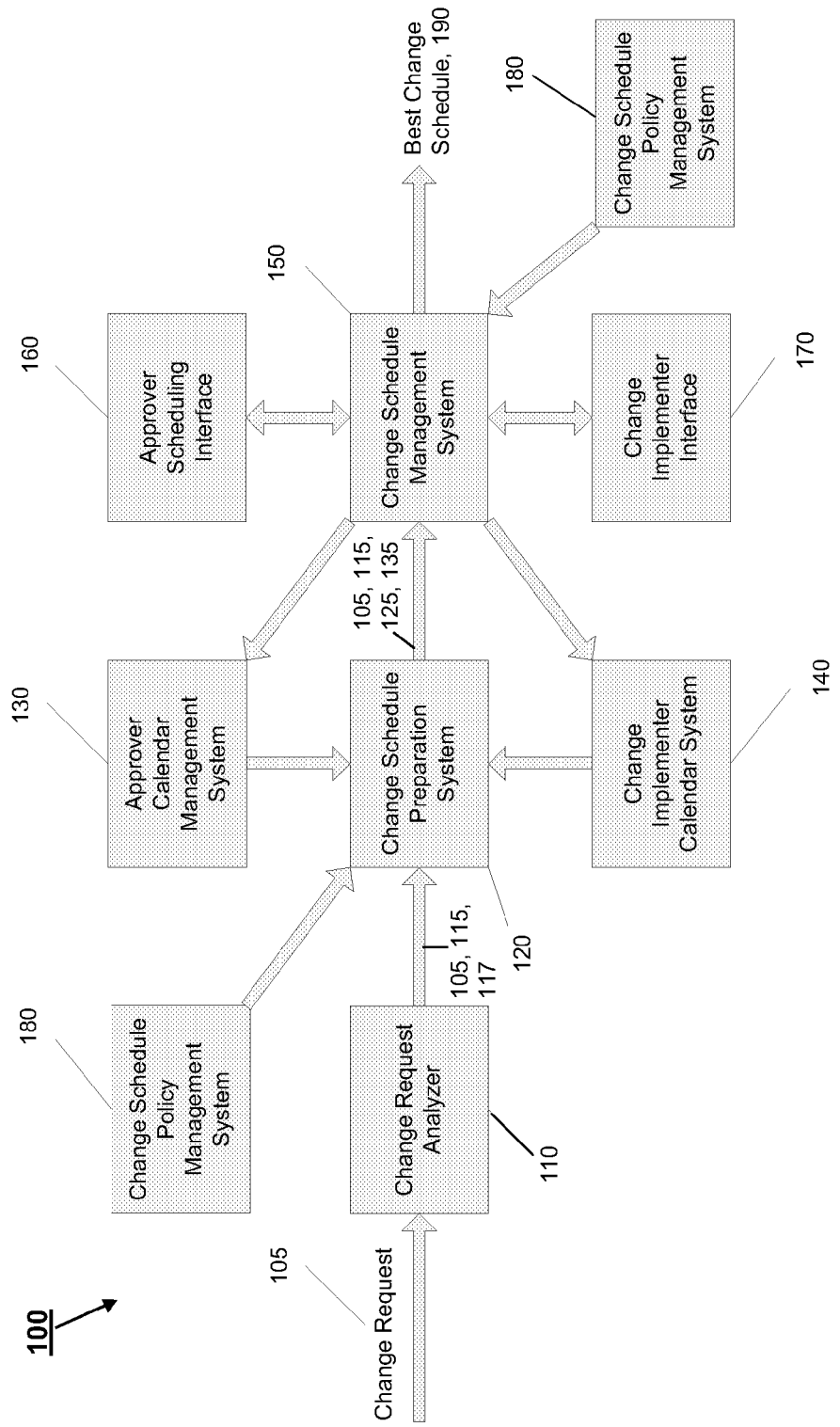
FIG. 1 is a schematic representation of a change system.

FIG. 1 shows a preferred embodiment 100 of the invention. A change request 105 is first analyzed by a Change Request Analyzer 110 to determine:
  (i) the list of approvers 115 who need to approve the change, and
  (ii) the change due date 117 (i.e., the latest date by which a change must be applied).

Following the Change Request Analyzer 110, the change request 105 is processed by a Change Schedule Preparation System 120. In addition to the change request 105, the Change Schedule Preparation System 120 takes as inputs the generated list of approvers 115 and the change due date 117. For each approver, the Change Schedule Preparation System 120 performs queries on an Approver Calendar Management System 130 and on the Change Schedule Policy Management System 180 to determine one or more possible change schedules. Each such possible change schedule must meet the following criteria:
 (i) it must allow the change to be completed prior to the change due date 117, and
 (ii) it must not violate any existing policies associated with the service to which a change is being applied, and
 (iii) it must not violate any existing policies associated with services that may depend on the service component to which a change is to be applied.

The Approver Calendar Management System 130 maintains, for each time interval, the activity associated with each service component in the system. It also maintains the dependency relationships among service components that exist during a time interval. The dependency relations link calendars of multiple service components and thus, provide information on possible activities a service component is expected to participate at any given time. For example, if a web service is to be deployed from 6 pm to midnight on every Friday and the web service is to be deployed on a WebSphere™ Application Server running on server $S_1$ and performing transactions using a DB2™ database server running on another server $S_2$, the Approver Calendar Management System 130 marks 6 pm to midnight every Friday as the deployment period for the web service. This is part of the calendar information for that web service. In addition, for those time periods, it links the calendar for the web service to the calendars of WebSphere™ Application Server, the DB2™ database server, which are then linked with the calendars of the servers $S_1$ and $S_2$. Basically the links traverse the dependency relations. The links are bidirectional.

In the calendar system, the required state of the higher-level service (such as the web service, in the above example) is propagated down the dependency tree and imposed on the services identified to provide the necessary support. Thus, in the above example, since web service needs to be up and running from 6 pm to midnight every Friday, the supporting service components (i.e., the WebSphere™ Application Server, DB2™ server, and the servers S1 and S2) are also marked in the Calendar Management System 130 as up and running during those time periods. Since a service may provide support to multiple higher level services, all such relations are maintained in the Calendar System.

The Change Schedule Policy Management System 180 defines service specific policies and priorities that can be used to resolve conflicts. It also includes policies on the types of changes that are allowed to override the normal expected states defined by the dependency relations. The policies may also explicitly forbid any type of changes to any of the supporting components over a period regardless of state of the service. For example, a policy associated with a web service provides a critical accounting service may disallow any changes to any of the supporting components during the last week of a fiscal quarter. The effects of these policies propagate down the dependency relations. Any service component, selected to provide a particular support, is also bound by that policy during the period it is selected to provide that support. Some of the policies governing a service are defined by the approver managing the service, while others may be system-wide policies and still others may be a result of the dependency relations. An approver can use policies to indicate:
 (i) explicit blackout time intervals where changes are not to be applied,
 (ii) explicit time intervals set aside for maintenance purposes, and
 (iii) implicit dependencies not expressed by the known explicit dependencies.

The dependency relations among service components and the associated policies give rise to constraints on the possible change schedules for any of service components. The Calendar Management System 130 maintains the dependency relations and the Policy Management System 180 maintains the relevant policies. For a specific service component, the Change Schedule Preparation System 120 extracts the dependency relations and any relevant policies. From this information, it determines the all the conditions and rules governing multiple time intervals until the change due date 117. These rules and conditions are referred to as change schedule constraints.

In summary, the change schedule constraints, for a service component, are a result of one or more of the following factors:
 (i) the expected demand on the service component by the end users or by other services that are dependent on the component being changed,
 (ii) the priority of the demand,
 (iii) the state of the service components on which the said service component depends upon,
 (iv) existing policies on the state of the affected service, services that depend on the affect service, and those that the affected service depends upon, and
 (v) existing policies regarding the change.

As mentioned earlier, the Approver Calendar Management System 130 maintains the dependency relations among the service components and the relative importance of those relations. It also maintains the effect of the existing policies on the activities and the state of the individual service components. The Approver Calendar System 130 in effect maintains the activity reservation calendar for each service component and the preferences among those activities as determined by the existing policies.

Just as a service component may depend on more than other service component, multiple service components may depend on a single common service component. For example, multiple web services may access the same database service. In such cases, the change schedules of the database service or the change policies for the database service can affect the availability of the dependent web services components and vice versa.

The dependency relations and the associated policies are both dynamic; i.e., they can evolve over time. The Approver Calendar System 130 maintains this dynamic information across dependencies among the components. This allows a high priority demand on higher level component during a certain time window to translate into a strong constraint against scheduling a change during that time window to a component supporting the said higher level component. Similarly, if one of the supporting service components of a higher level service component requires a high severity (and hence high priority) change during a certain time window, and there is no substitute for that service component, then supported higher level service cannot be brought online during the period when the change is to be applied. This affects not only the availability of the high level service, but also affects the constraints on other supporting service components of that higher level service. Thus, scheduling a change to a lower level service component can improve the chances of scheduling a change to any of the other service components in the dependency tree. However, for each service component, the change schedules must be determined taking into account all of its constraints. Because of the interdependencies among service component, this means constraints must be evaluated simultaneously to determine the possible change schedules to multiple service components.

By combining the uptime requirements obtained by considering the inter-component dependencies and approver specific policies, for any IT component, the Approver Calendar Management System 130 divides time associated with that component into intervals characterized by the degree to which the component is amenable to a change during that time interval. Thus, for each component and for each relevant approver, the Approver Calendar Management System 130 divides the time of the day, week, and month into time intervals that are characterized by the degree to which an IT component is amenable to a change schedule from the point of that the corresponding approver. By analyzing the effects of the constraints, it determines the time intervals when change schedules are possible and when they are not possible. If there are conflicting conditions, these are resolved using the default or explicit policies.

The Change Schedule Preparation System 120 also interacts with a Change Implementer Calendar System 140. The Change Implementer Calendar System 140 maintains change implementer's schedule, change specific requirements such as any dependencies to be satisfied to carry out a change and change specific constraints such as number and type of changes that can be carried out at a time. Using the component-specific constraints on the change schedule specified in the two calendar systems 130, 140, the Change Schedule Preparation System 120 prepares a list 125 of possible change schedules. Recall that one of the change schedules from this list is to be selected by the approvers. Each change schedule is accompanied by factors that quantify the impact of the unavailability of that IT component on the dependent components. If the dependent IT component is a priority component and it is going to be unavailable because of the change schedule, then the negative impact of that change schedule is higher. Similarly, if multiple components are supported by a component and those components need to be taken down during the change period, the impact is higher than when fewer components need to be taken down. On the other hand, if the priority of the change is high and the proximity of that change schedule to change due date is short, the positive impact of the change schedule high.

The Change Schedule Preparation System 120 also computes weights for each approver for each time window. Recall also that each approver represents a particular IT service or end user interests. The importance of that service to the overall IT system varies over time. Similarly, not all time intervals are of equal importance to a user group as far as that IT service is concerned. In addition, the importance of the user group within the entire user community varies over time. (For example, accountants and their applications may get higher priority over strategists and market analysts at the end of fiscal quarter, but before launching a new product, market strategists may have higher priority over use of IT services). For this reason, each approver is associated with a different weight 135 for each change schedule in the change schedule list prepared by the Change Schedule Preparation System 120.

The change request 105, the approver list 115, change schedule list 125, and the approver specific weights 135 for each possible change schedule all are passed to a Change Schedule Management System 150. The Change Schedule Management System 150 presents the change schedule list 125 to each approver via the Approver Scheduling Interface 160. Each approver is asked to assign a numeric preference value to each possible change schedule in the change schedule list 125.

The Change Schedule Management System 150 determines the change schedule that balances the needs of the users and the need to apply the change. This is done by taking into account the approver assigned preference values to the possible change schedules and the approver weights. The approver assigned preferences determines the relative goodness of possible change schedules from the point of view of an approver. Using the approver weights the approver assigned weights are normalized so the preferences can be compared and possible change schedules can be ordered by the weighted preferences. The most preferred change schedule in this ordered list is referred to as the best change schedule since it has the highest average normalized preference value assigned by the approvers. The best change schedule 190 thus determined is then declared to be the actual schedule for applying the change.

The weighted preferences for the change schedules normally identify one the possible change schedules as the best of all possible change schedules. In some rare situations, however, there may be a tie between two or more possible change schedules. Also, it is possible, depending on the choice of the weights assigned to the approvers and the number of approvers involved, that the best change schedule may be highly undesirable for high priority user groups for that time interval. To avoid such undesirable situations, the Change Schedule Management System 150 interacts with the change implementer via a Change Implementer Interface 170 who has the authority to override or remove certain choices from the change schedule lists 125. Policies in Change Schedule Policy Management System 180 also may define the priorities among user groups in case of ties.

In another embodiment, in the case of a tie, the approver list is pruned to include only high priority approvers. Only the preferences of the subset approvers are then evaluated to determine the best change schedule. Again, policies in Policy Management System 180 define the subset of approvers to be considered in the case of ties.

The Best Change Schedule 190 is outputted from the Schedule Management System 150.

The overall procedure followed by the Change Schedule Management System 150 can be stated as follows:
   (a) Let R be the number of approvers associated with a change, as determined by Change Request Analyzer 110
   (b) Let T be the set of possible change schedules determined by the Change Schedule Preparation System 120 as the Change Schedule List 125
   (c) Let S(i) be the set of possible change schedules that are acceptable to Approver i
   (d) Then T−S(i) is the set of possible change schedules that are completely unacceptable to Approver i because of the existing policies and dependencies
   (e) Let n(i) be the total number possible change schedules in S(i)
   (f) If |T| represents the number of elements in T, then
      |T|<=SUM of n(i) where i=1 to R
      i.e., the total number of change schedules in T is less than or equal to the sum of all possible change schedules for each approver. The relation is less than or equal to because some of the change schedules may be present in more than one set S(i), i=1, R (g) Let $P_j^{(i)}$ be the preference value assigned to the $j^{th}$ change schedule in T by Approver i (h) $-1<=P_j^{(i)}<=1$ if $\{T_j\}$ is in $S(i)$ $P_j^{(i)}=-1$, otherwise i.e., if a change schedule is in Approver i's acceptable change schedule set, the approver can assign any preference value between 1 and −1 to that schedule; if it is not in S(i), the preference value is automatically set to −1. The preference value for each element in S(i) is obtained from Approver i by the Change Schedule Management System 150 via the Approver Scheduling Interface 160.

(i) $W_j^{(i)}$ be the weight assigned to Approver i for the $j^{th}$ change schedule in T.

$0<=W_j^{(i)}<R$

This value is determined by the Change Preparation System 120 and is part of the Approver weight array 135.

(j) Thus, the normalized preference value assigned to change schedule $\{T_j\}$ by Approver i is $W_j^{(i)}*P_j^{(i)}$ (k) The average normalized preference value for change schedule $\{T_j\}$ over all approvers is (SUM over $W_j^{(i)}*P_j^{(i)}$ for i=1, R)/R The change schedule with the highest average normalized preference value is output as the Best Change Schedule 190 by the Change Schedule Management System 150.

Figure 2:
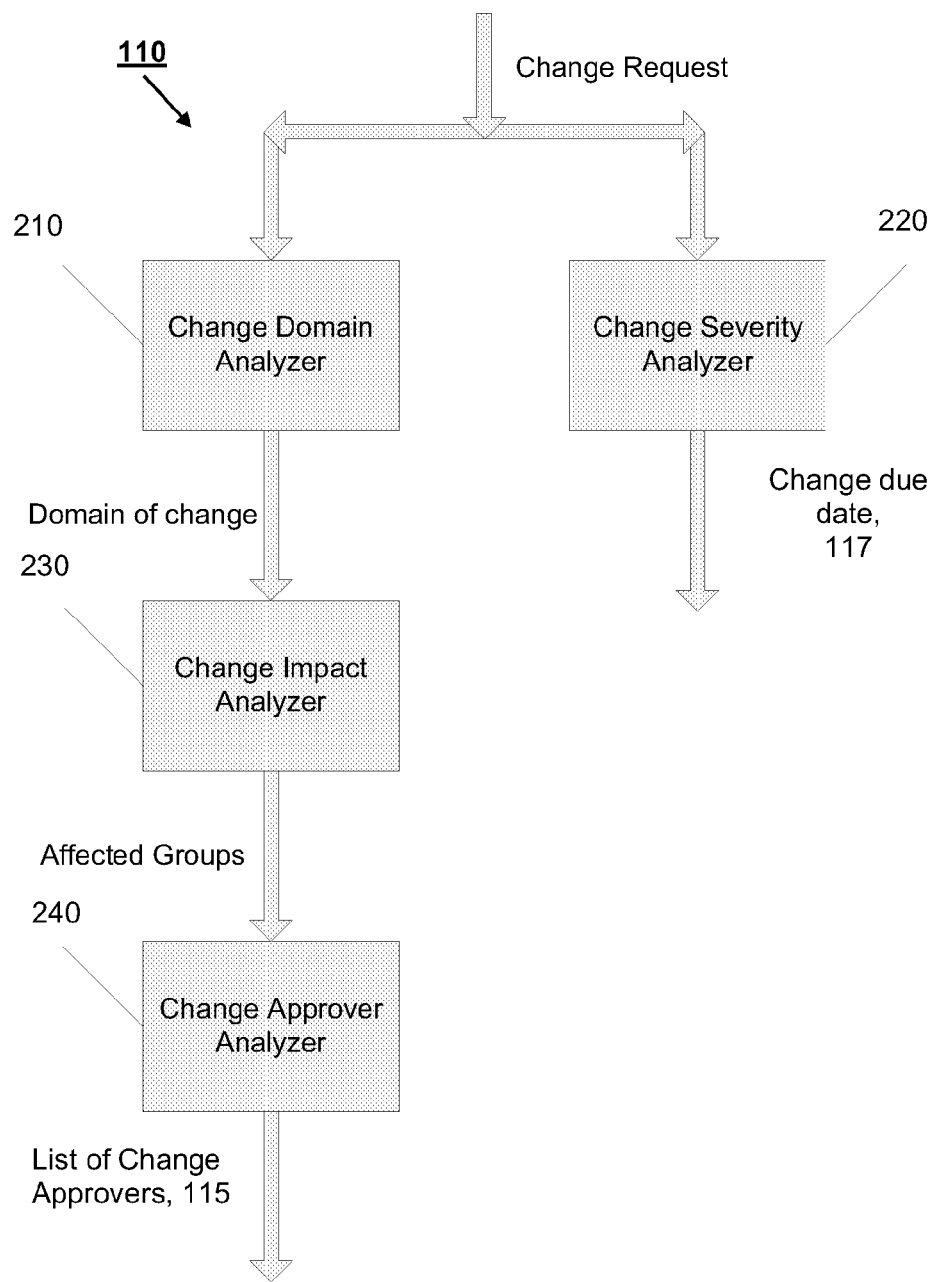
FIG. 2 is a schematic representation of a Change Request Analyzer.

FIG. 2 shows the components of the Change Request Analyzer 110 in detail. A Change Severity Analyzer 220 determines the severity and the overall importance of the change. Policies in Change Schedule Policy Management System 180 define, for each IT component in the system, the maximum duration for applying a change for each severity level. Using these policies, the Change Severity Analyzer 220 calculates the date by which the change must be applied. A Change Domain Analyzer 210 determines the domain to which the change request applies and the components directly and indirectly affected by the change. The components to be changed are specified in the change request 105. The indirectly affected components are determined by interrogating the Approver Calendar Management System 130 for dependencies associated with the directly affected components in the interval from the present time till the due date. As described earlier, the dependency relations and associated policies together determine the effect of change on supporting and supported components. The policy information is obtained from the Change Schedule Policy Management System 180. A Change Impact Analyzer 230 determines the impact of the change on other components in the IT system. A Change Approver Analyzer 240 determines the change approver list 115 for that change request based on the output of the impact analysis.

Figure 3A:
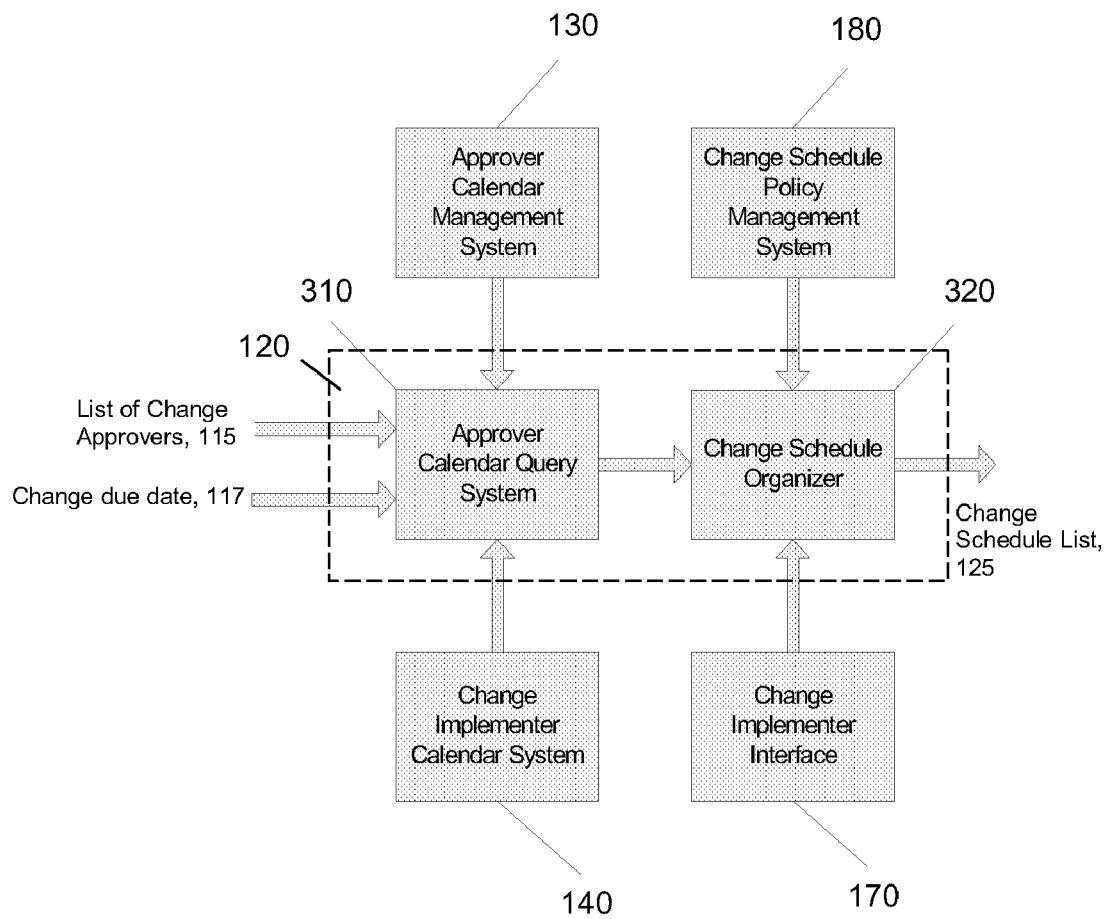
FIG. 3A is a schematic representation of a Change Schedule Preparation System.
Figure 3B:
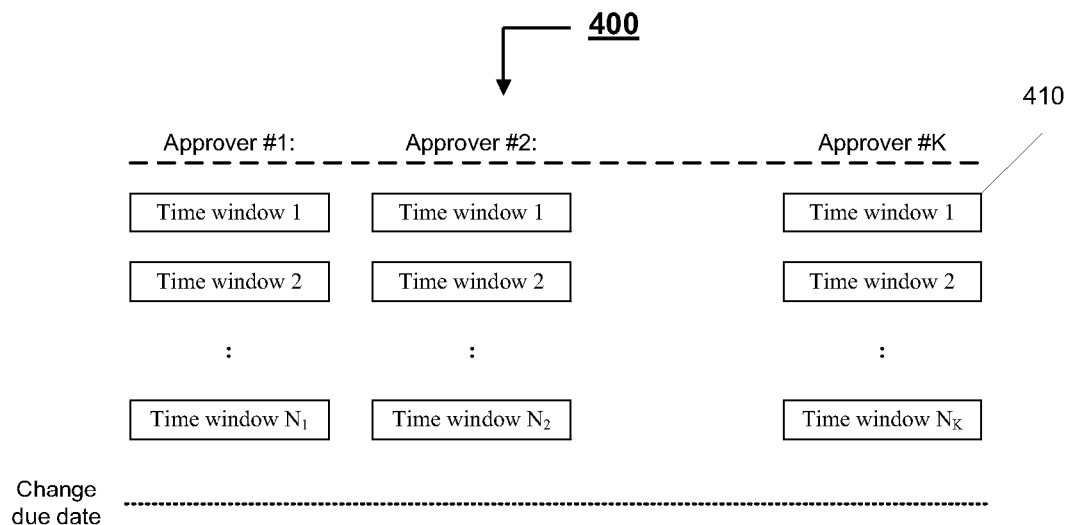
FIG. 3B is a listing of a possible change schedule.

In FIG. 3A, the Change Schedule Preparation System 120 is shown in detail, and includes an Approver Calendar Query System 310, which interacts with the Approver Calendar Management System 130 and the Change Implementer Calendar System 140. The Query System 310 determines a list of possible change schedules from the point of each approver. The Query System 310 also determines the degree of preference of the approver for each such change schedule. The output 400 of the Approver Calendar Query System 120 is shown in FIG. 3B. A list 410 of possible change schedules is given for each approver. The change schedules 410 are annotated with the approver specific preference and degree of effect on other component if that change schedule were to be selected.

Figure 3C:
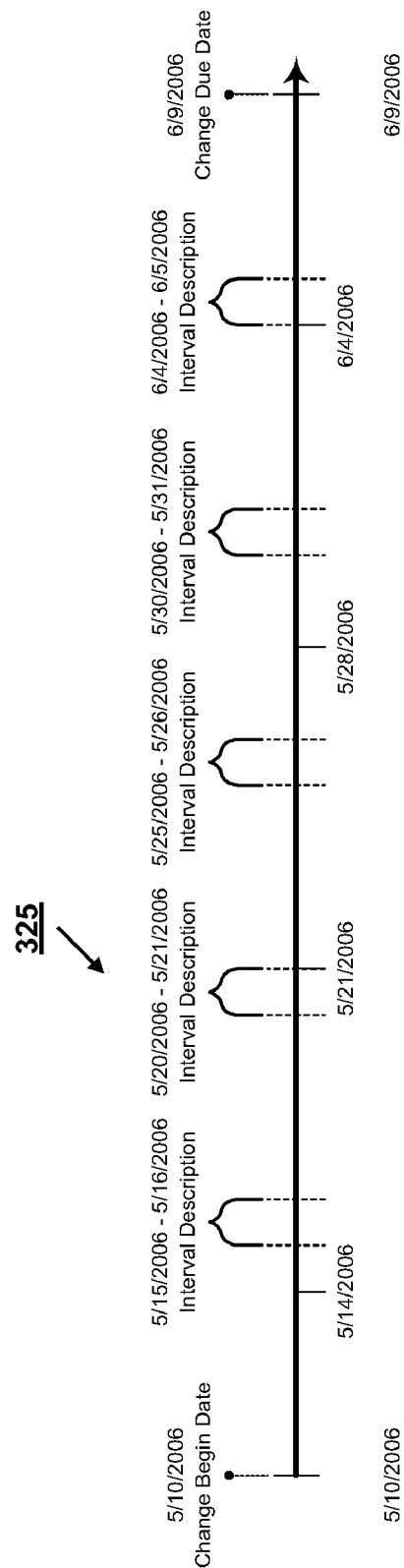
FIG. 3C is an output list from a Change Schedule Organizer.

The Change Schedule Preparation System 120 also includes a Change Schedule Organizer 320, that takes as input the all-possible change schedules obtained by the Approver Calendar Query System 310, and interacts with the Change Schedule Policy Management System 180 and the Change Implementer via the Change Implementer Interface 170. The Change Schedule Organizer 320 produces a single list of change schedules 325 by merging the multiple change schedule lists. The Organizer 320 also may eliminate certain change schedules that are in violation with existing policies. The output list 125 produced by the Change Schedule Organizer 320 is shown in FIG. 3C. In this list, the change schedules 410 shown in FIG. 3B are merged. The change schedules are shown on a time line so the relative position of each window is apparent and the approver specific information is in the Interval Description for each time interval in the list 125.

Figure 4:
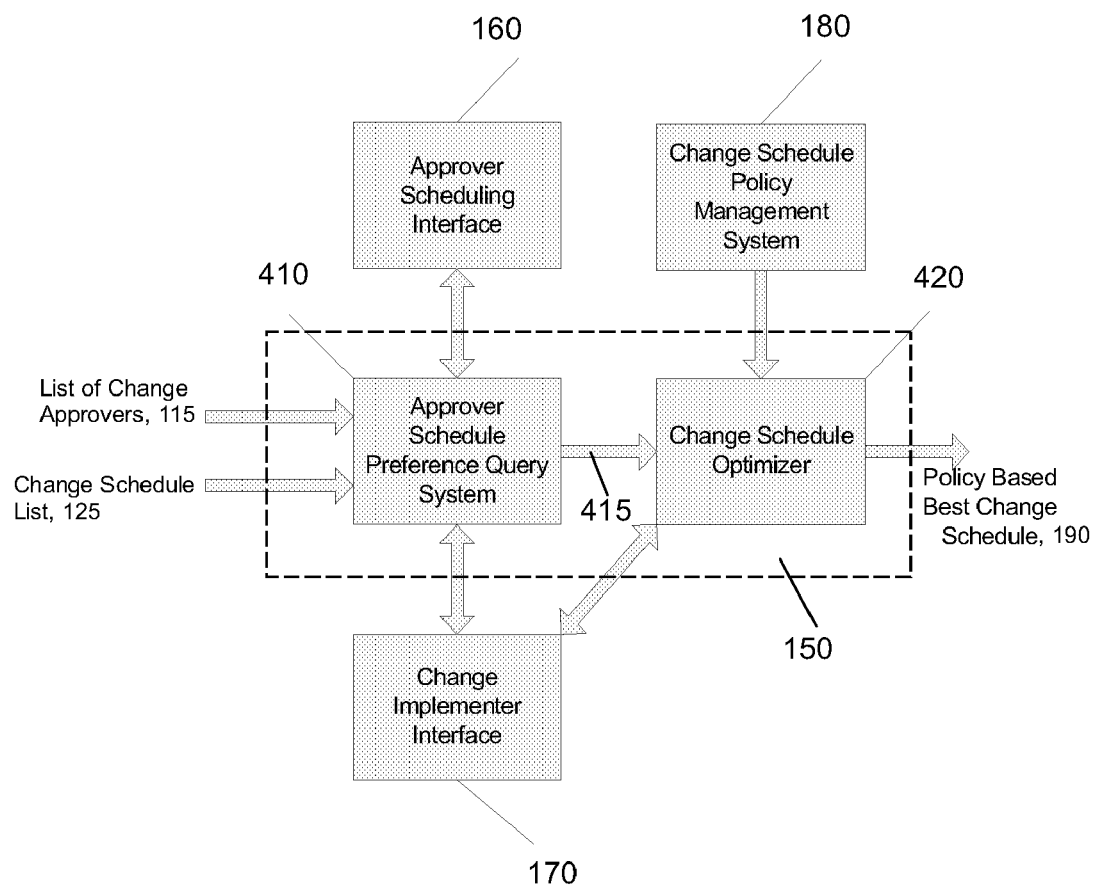
FIG. 4 is a schematic representation of a Change Schedule Management System.

FIG. 4 shows the Change Schedule Management System 150 in greater detail. An Approver Schedule Preference Query System 410 interacts with the approvers via the Approver Scheduling Interface 160, and with the change implementer via the Change Implementer Interface 170. By these interactions, the Approver Schedule Preference Query System 410 obtains the quantitative preferences for each possible change schedule from the approvers. In effect, approvers get to vote on the possible choices and they specify preferences by assigning a numerical value to each choice of change schedule. The numerical values are selected from a range specified by the Query System 410. The change implementer also can provide his/her preferences. The Query System 410 forwards the results 415 of the query to a Change Schedule Optimizer 420. The Optimizer 420 takes into account the approver provided preferences, constraint attributes associated with each change schedule, approver weights, and existing policies. The Optimizer 420 obtains the policy specific information by interacting with the Change Schedule Policy Management System 180. Using this information, the Optimizer 420 determines the best change schedule 190.

Figure 5:
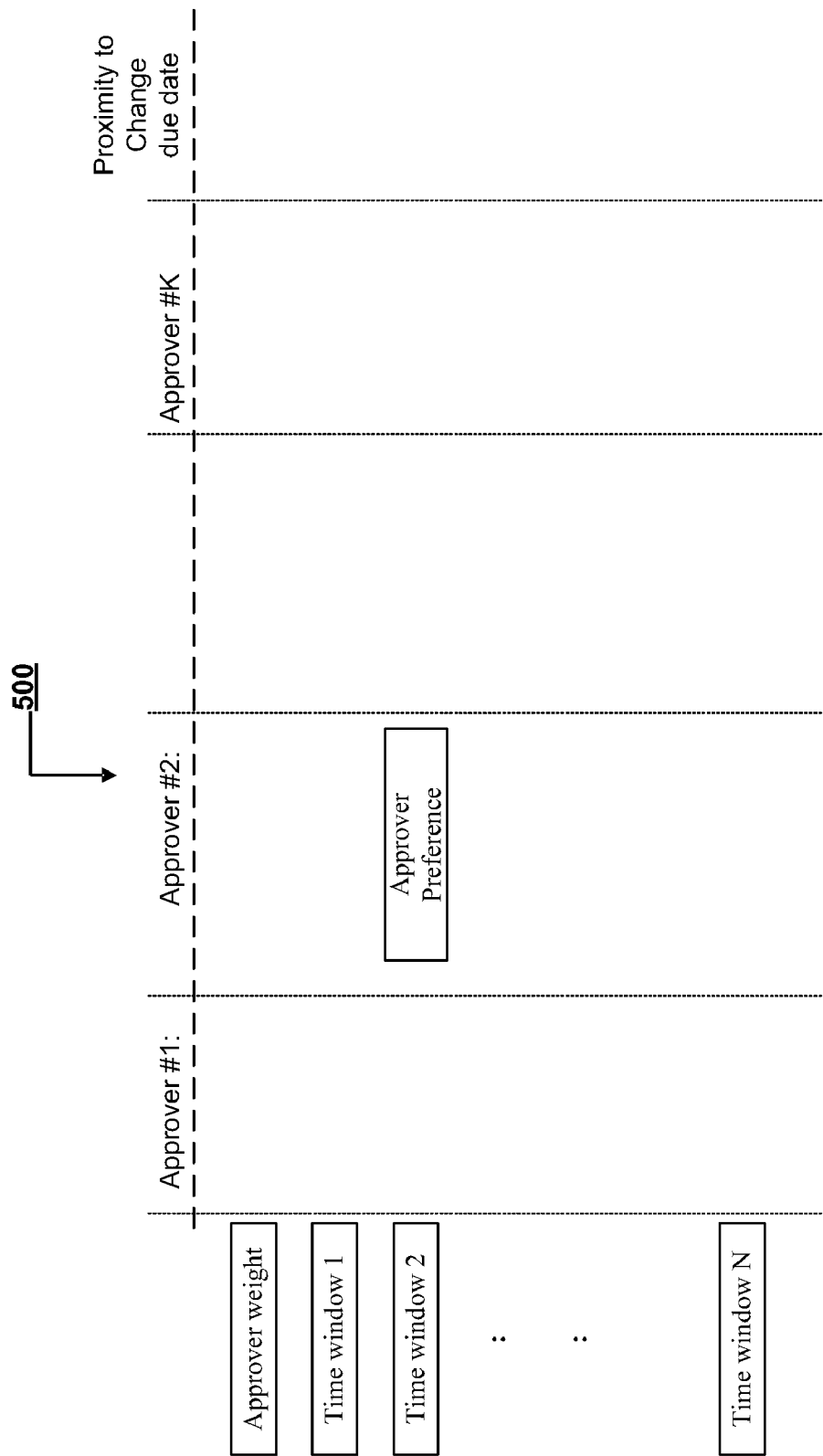
FIG. 5 is a listing of the candidate best change schedule.

FIG. 5 shows the matrix 500 formed used by the Optimizer 420 in determining the best change schedule 190. The rows of the matrix 500 are the possible change schedules and the columns are the approvers. One or more additional columns may be added to incorporate change schedule specific constraints. The proximity to the change due date is shown as one such constraint. Typically, changes too close to the due date are to be avoided. Approver weights are shown as one of the rows of the matrix. The main elements of the matrix 500 are approver preferences, as specified by each approver, for each possible change schedule.

In one embodiment, the best change schedule is the one with the highest average normalized preference value. The normalized preference values are calculated by multiplying the approver weight and the approver preference values in each column of matrix 500. Following this the products in each row are added together. This sum is then divided by the number of approvers to calculate the average of the normalized preferences for each change schedule. The row with the highest sum indicates the best change schedule.

Figure 6:
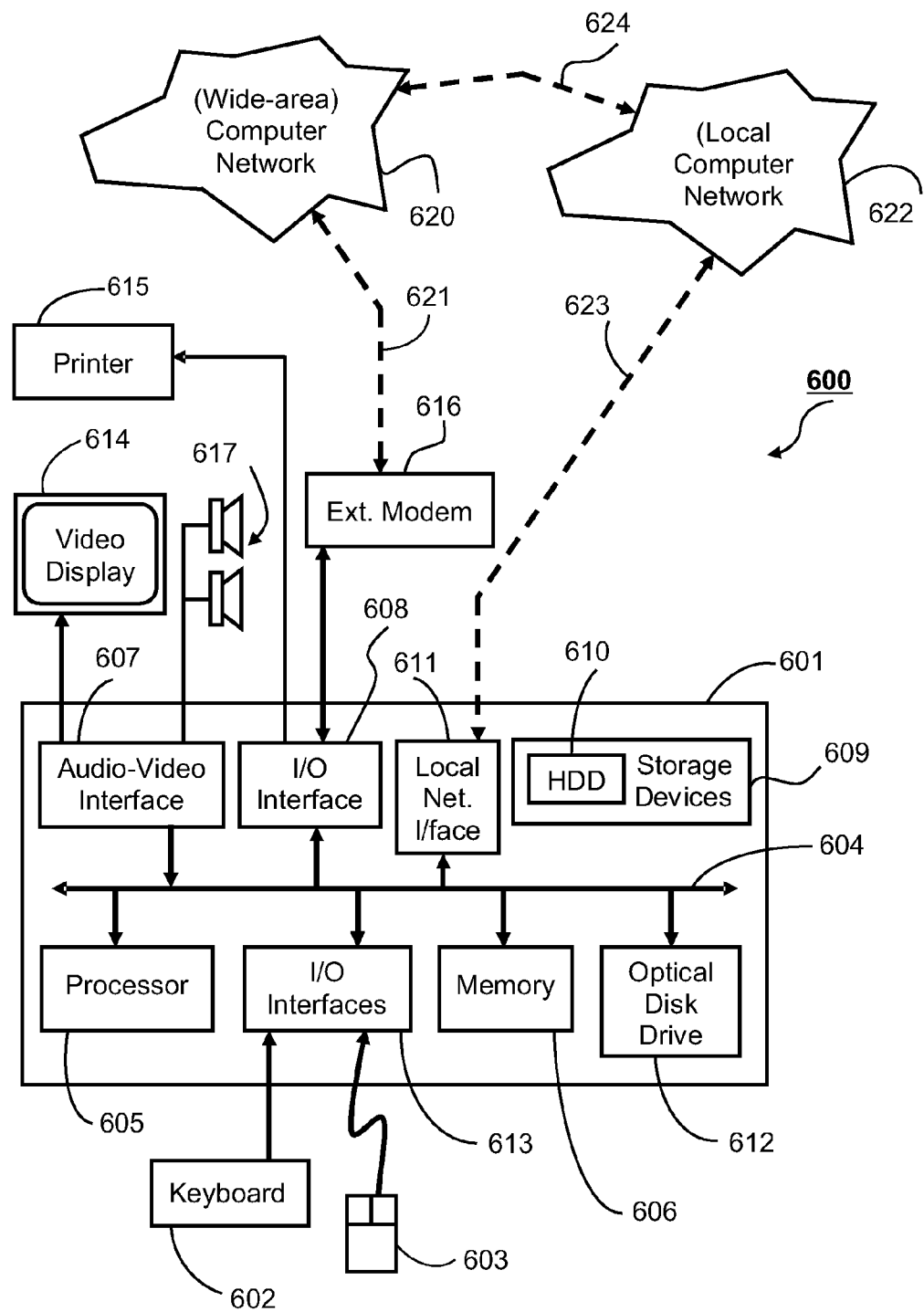
FIG. 6 is a flowchart of a computer system in which the change system can be implemented.

The method of determining a change schedule may be implemented using a computer system 600, such as that shown in FIG. 6 wherein the processes of FIGS. 1, 2, 3A and 4 may be implemented as software, such as one or more application programs executable within the computer system 600. In particular, the steps of the method are given effect by instructions in the software that are carried out within the computer system 600. The instructions may be formed as one or more code modules, each for performing one or more particular tasks. The software may also be divided into two separate parts, in which a first part and the corresponding code modules performs the obfuscation methods and a second part and the corresponding code modules manage a user interface between the first part and the user. The software may be stored in a computer readable medium, including the storage devices described below, for example. The software is loaded into the computer system 200 from the computer readable medium, and then executed by the computer system 200. A computer readable medium having such software or computer program recorded on it is a computer program product. The use of the computer program product in the computer system 600 preferably gives effect to an advantageous apparatus for determining a change schedule.

As seen in FIG. 6, the computer system 600 is formed by a computer module 601, input devices such as a keyboard 602 and a mouse pointer device 603, and output devices including a printer 615, a display device 614 and loudspeakers 617. An external Modulator-Demodulator (Modem) transceiver device 616 may be used by the computer module 601 for communicating to and from a communications network 620 via a connection 621. The network 620 may be a wide-area network (WAN), such as the Internet or a private WAN. Where the connection 621 is a telephone line, the modem 616 may be a traditional "dial-up" modem. Alternatively, where the connection 621 is a high capacity (e.g.: cable) connection, the modem 616 may be a broadband modem. A wireless modem may also be used for wireless connection to the network 620.

The computer module 601 typically includes at least one processor unit 605, and a memory unit 606 for example formed from semiconductor random access memory (RAM) and read only memory (ROM). The module 601 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the external modem 616 and printer 615. In some implementations, the modem 616 may be incorporated within the computer module 601, for example within the interface 608. The computer module 601 also has a local network interface 611 which, via a connection 623, permits coupling of the computer system 600 to a local computer network 622, known as a Local Area Network (LAN). As also illustrated, the local network 622 may also couple to the wide network 620 via a connection 624, which would typically include a so-called "firewall" device or similar functionality. The interface 611 may be formed by an Ethernet™ circuit card, a wireless Bluetooth™ or an IEEE 802.21 wireless arrangement.

The interfaces 608 and 613 may afford both serial and parallel connectivity, the former typically being implemented according to the Universal Serial Bus (USB) standards and having corresponding USB connectors (not illustrated). Storage devices 609 are provided and typically include a hard disk drive (HDD) 610. Other devices such as a floppy disk drive and a magnetic tape drive (not illustrated) may also be used. An optical disk drive 612 is typically provided to act as a non-volatile source of data. Portable memory devices, such optical disks (e.g.: CD-ROM, DVD), USB-RAM, and floppy disks for example may then be used as appropriate sources of data to the system 600.

The components 605, to 613 of the computer module 601 typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations, Apple Mac™ or like computer systems evolved therefrom.

Typically, the application programs discussed above are resident on the hard disk drive 610 and read and controlled in execution by the processor 605. Intermediate storage of such programs and any data fetched from the networks 620 and 622 may be accomplished using the semiconductor memory 606, possibly in concert with the hard disk drive 610. In some instances, the application programs may be supplied to the user encoded on one or more CD-ROM and read via the corresponding drive 612, or alternatively may be read by the user from the networks 620 or 622. Still further, the software can also be loaded into the computer system 600 from other computer readable media. Computer readable media refers to any storage medium that participates in providing instructions and/or data to the computer system 600 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

We claim:

1. A computer-implemented method for determining a best change schedule in response to a change request in an information technology system affecting two or more approvers in a change period, said approvers having change constraints, the method comprising:

receiving, by a computer, a number of change requests, each of said change requests being associated with a list of approvers and a change due date;

determining, by said computer, a set of candidate change schedules for each of a number of change periods on a basis of said change constraints, wherein said change constraints include computed weights for each approver from said list of approvers for each of said change periods, based on an importance of a corresponding change request to said each approver;

inputting, to said computer, preference values from said each approver for each of said candidate change schedules;

determining, by said computer, which approvers of said list of approvers are affected by each of said change requests and retaining only those affected approvers to determine said set of candidate change schedules;

weighting, by said computer, said preference values for each of said candidate change schedules by said weights for each said approver to obtain weighted preference values for each of said change periods; and ordering, by said computer, said set of candidate change schedules according to a sum of said weighted preference values to obtain said best change schedule for each of said change periods.

2. The method of claim 1, wherein said candidate change schedules include only those that are valid prior to said change due date for each of said change requests.

3. A computer system for determining a best change schedule in response to a change request in an information technology system affecting two or more approvers in a change period, said approvers having change constraints, said system comprising:

a memory that stores data; and a processor configured to:

receive a number of change requests, each of said change requests being associated with a list of approvers and a change due date;
determine a set of candidate change schedules for each of a number of change periods on a basis of said change constraints,
    wherein said change constraints include computed weights for each approver from said list of approvers for each of said change periods, based on an importance of a corresponding change request to said each approver;
receive inputted preference values from said each approver for each of said candidate change schedules;
determine which approvers of said list of approvers are affected by each of said change requests and retain only those affected approvers to determine said set of candidate change schedules;
weight said preference values for each of said candidate change schedules by said weights for each said approver to obtain weighted preference values for each of said change periods; and
order said set of candidate change schedules according to a sum of said weighted preference values to obtain said best change schedule for each of said change periods.

4. The system of claim 3, wherein said candidate change schedules include only that are valid prior to said change due date for each of said change requests.

5. A non-transitory computer readable storage medium, readable by a computer, tangibly embodying a program of instructions executable by said computer to perform a method for determining a best change schedule in response to a change request affecting two or more approvers in a change period, said approvers having change constraints, the method comprising:

receiving, by a computer, a number of change requests, each of said change requests being associated with a list of approvers and a change due date;
determining a set of candidate change schedules for each of a number of change periods on a basis of said change constraints,
    wherein said change constraints include computing weights for each approver from said list of approvers for each of said change periods, based on an importance of a corresponding change request to said each approver;
inputting preference values from said each approver for each of said candidate change schedules;
determining which approvers of said list of approvers are affected by each of said change requests and retaining only those affected approvers to determine said set of candidate change schedules;
weighting said preference values for each of said candidate change schedules by said weights for each said approver to obtain weighted preference values for each of said change periods; and
ordering said set of candidate change schedules according to a sum of said weighted preference values to obtain said best change schedule for each of said change periods.

6. The non-transitory computer readable storage medium of claim 5, wherein said candidate change schedules include only those that are valid prior to said change due date for each of said change requests.

* * * * *